(12) United States Patent
Agapiev

(10) Patent No.: US 10,503,791 B2
(45) Date of Patent: Dec. 10, 2019

(54) SYSTEM FOR CREATING A REASONING GRAPH AND FOR RANKING OF ITS NODES

(71) Applicant: Borislav Agapiev, Portland, OR (US)

(72) Inventor: Borislav Agapiev, Portland, OR (US)

( * ) Notice: Subject to any disclaimer, the term of this patent is extended or adjusted under 35 U.S.C. 154(b) by 17 days.

(21) Appl. No.: 15/793,751

(22) Filed: Oct. 25, 2017

(65) Prior Publication Data

US 2019/0073420 A1 Mar. 7, 2019

Related U.S. Application Data

(60) Provisional application No. 62/553,944, filed on Sep. 4, 2017.

(51) Int. Cl.
*G06F 16/951* (2019.01)
*G06F 17/16* (2006.01)
*G06N 3/08* (2006.01)
*G06N 20/00* (2019.01)
*G06F 16/901* (2019.01)

(52) U.S. Cl.
CPC ........ *G06F 16/951* (2019.01); *G06F 16/9024* (2019.01); *G06F 17/16* (2013.01); *G06N 3/08* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 6,076,088 A * | 6/2000 | Paik | G06F 16/367 |
| 6,285,999 B1 | 9/2001 | Page | |
| 7,716,179 B1 | 5/2010 | Agapiev et al. | |
| 7,716,205 B1 | 5/2010 | Agapiev | |
| 7,805,455 B2 * | 9/2010 | Todhunter | G06F 17/30967 707/759 |
| 8,452,851 B2 | 5/2013 | Kabiljo et al. | |
| 8,799,296 B2 | 8/2014 | Agapiev | |
| 9,646,248 B1 * | 5/2017 | Benvenuto | G06N 5/022 |
| 9,715,552 B2 * | 7/2017 | Ilyas | G06F 17/30867 |
| 2006/0041424 A1 * | 2/2006 | Todhunter | G06F 17/2785 704/9 |
| 2007/0094219 A1 * | 4/2007 | Kipersztok | G06Q 10/04 706/52 |

(Continued)

OTHER PUBLICATIONS

Al Hashimy et al "An Automated Learner for Extracting New Ontology Relations", IEEE 2013, 6 pages.*

(Continued)

*Primary Examiner* — Uyen T Le
(74) *Attorney, Agent, or Firm* — Ascenda Law Group, PC

(57) ABSTRACT

A Reasoning Graph is defined as a directed graph characterized by nodes that can be, but are not limited to, concepts, situations, conditions, events, and persons with edges between nodes if one node is a cause of another node (its effect). The Reasoning Graph is automatically generated by analyzing a large corpus text from a repository such as the Wide World Web and other sources. The analysis leads to creation of edges within the graph based on, for example, lexical and semantic analysis of the text. Nodes of the Reasoning Graph can be ranked according to eigenvalue analysis of the connectivity matrix associated with the Reasoning Graph, including through application of both random as well as reasoning surfer models.

5 Claims, 3 Drawing Sheets

(56) References Cited

U.S. PATENT DOCUMENTS

| | | | | |
|---|---|---|---|---|
| 2008/0033932 A1* | 2/2008 | DeLong | ............ | G06F 17/30864 |
| 2009/0248399 A1* | 10/2009 | Au | ........................... | G06F 17/27 704/9 |
| 2013/0138662 A1* | 5/2013 | He | .................... | G06F 17/30528 707/748 |
| 2015/0317389 A1* | 11/2015 | Hua | .................. | G06F 17/30705 706/12 |
| 2016/0321244 A1* | 11/2016 | Hashimoto | ......... | G06F 17/2785 |
| 2017/0220937 A1* | 8/2017 | Wada | ....................... | G06N 5/04 |
| 2017/0364820 A1* | 12/2017 | Ko | ........................ | G06N 7/005 |

OTHER PUBLICATIONS

Radinsky et al, "Learning to Predict from Textual Data", Journal of Artificial Intelligence Research 45 (2012) pp. 641-684.*

Radinsky et al, "Learning Causality from Textual Data", 2011, 6 pages.*

Bojduj, "Extraction of Causal-Association Networks From Unstructured Text Data", Thesis paper (Jun. 2009), Faculty of California Polytechnic State University, San Luis Obispo, 70 pages.

Freitas; et al., "Reasoning with Graphs", Electronic Notes in Theoretical Computer Science (2006), 165:201-212.

Gardner, "Reading and Reasoning with Knowledge Graphs", Thesis paper (2015), Language Technologies Institue School of Computer Science, Carnegie Mellon University, Pittsburg, PA, 147 pages.

Harris, "Distributional Structure", *Word* (1954), 10(2-3):146-162.

Lee-Hand; et al., "A neural network model of causative actions", Frontiers in Neurorobotics (Jun. 30, 2015), 9(4):1-19.

McCartney, "Natural Language Inference", Dissertation (Jun. 2009), The Department of Computer Science and the Committee on Graduate Studies of Stanford University, 179 pages.

Pearl, "Graphical Models for Probabilistic and Causal Reasoning", Forthcoming, Computing Handbook, Third Edition: Computer Science and Software Engineering, vol. I, Technical Report R-236 (Feb. 2013), 29 pages.

Sizov; et al., "Automatic Extraction of Reasoning Chains from Textual Reports", Proceedings of the TextGraphs-8 Workshop (Oct. 18, 2013), Association for Computer Linguistics, Seattle, Washington, pp. 61-69.

\* cited by examiner

SYSTEM FOR CREATING A REASONING GRAPH AND FOR RANKING OF ITS NODES

RELATED APPLICATIONS

This application is a NONPORVISIONAL and claims the priority benefit of U.S. Provisional Application No. 62/553,944, filed Sep. 4, 2017, which is incorporated herein in its entirety.

FIELD OF THE INVENTION

The present invention relates to systems and methods for creation of a Reasoning Graph, enabling computers to achieve high-level human-like reasoning, through automated extraction and arrangement of causality relationships from vast quantities of unstructured text, and for ranking of its nodes.

BACKGROUND

One of the principal goals of the general field of Artificial Intelligence (AI) is to create and program computers and machines to exhibit human intelligence. Despite tremendous technological advances in raw processing power, leading to the ability to perform calculations at speeds far surpassing those capable by any human (e.g., on the order of trillions of operations per second), the storage and retrieval of vast amounts of information, and other areas, many argue that true AI has not yet been achieved. It is widely recognized that a principal reason for this is because computers only operate according to specific sequences of steps, called algorithms, to perform well-defined tasks, and the programming of such algorithms to mimic human cognitive functions has proven to be extremely difficult. Even the simplest of tasks for humans, such as the recognition of objects and features in images, speech, and natural language processing have turned out to be enormously difficult to implement in machines as it was and somewhat remains unclear as to how to write very large sets of rules covering many possible variations, ambiguities, and special and different cases prevalent in every-day human perception, communication, and processing of information.

To address shortcomings of traditional algorithmic programming, so-called artificial neural networks (ANN) have been developed. ANNs employ different paradigms of computation in an effort to solve problems such as those mentioned above. ANNs consist of multiple layers of simple computing elements, loosely resembling and inspired by biological neurons, which receive inputs from multiple other such elements. The multitude of connections between individual elements as well as between different layers of elements comprises the primary mechanism of computation, with inputs to initial layers being propagated and back-propagated amongst intermediate, hidden layers, and outputs being produced from a final layer.

Deep learning networks are a special class of ANNs with large numbers (tens, hundreds, or even thousands) of intermediate, hidden layers. Such deep learning networks have been trained to perform tasks such as autonomous control of self-driving cars (under certain conditions), recognition of objects and faces in images and videos, automated translation of text between different languages, detection of sentiment in short sequences of text, automated summarization of text, advanced game-playing in complex games such as Chess and Go (where they have reached or surpassed the abilities of top human players), and others. The multitude of such efforts, and the expenses associated therewith, illustrates the present commitment to the field of AI, with some believing that automated devices may eventually reach, or even surpass, human intelligence.

Programming ANNs involves a learning, or training, phase in which a given network is provided with sets of data. In supervised learning, an ANN is presented with known inputs that yield known outputs, which known outputs are compared to the outputs of the network being trained. Differences between the outputs of a network being trained and the known, desired outputs, called error, are computed and used to propagate small changes in values (or weights) associated with connections within the network. This process is successively repeated, with the intention of always decreasing the magnitude of the error in each iteration. The training stops when the magnitude of the error drops below a specified threshold.

In unsupervised learning, error is computed automatically, without any advance knowledge of desired outputs for known inputs. One example of a system that operates using what is generally considered an unsupervised learning method is word2vec. Word2vec can be used to produce word embeddings; that is, embedding of words from large bodies of unstructured texts into vector spaces of real numbers of bounded dimensionality, typically in the hundreds of dimensions. It is generally considered to employ unsupervised learning as it does not require a training set. Instead, the required relationships are automatically computed from very large bodies of text. According to a distributional hypothesis, words are assumed to be similar and related if they appear in similar contexts. See Harris Z. S., Distributional structure, Word, 10(23), 146-162 (1954). Word2vec assigns each unique word from a corpus of unstructured text to a corresponding vector and positions those vectors relative to one another in the vector space so that words sharing common contexts are located close to one another. Viewed differently, starting from randomly initialized vectors for the subject words, word2vec performs an optimization so as to minimize errors (the distances between words as represented in the vector space), so that the result is distances between vectors representing the words are closely proportional to ratios of relative co-occurrences of words in similar contexts. Word2vec, and a related method called phrase2vec, thus allow seeming syntactically different and unrelated words and phrases to be grouped within vector spaces.

Notwithstanding achievements such as those described above, the current state-of-the-art in AI still falls far short of the ultimate goal of mimicking human intelligence by lacking one of its principal aspects and capabilities: that of reasoning. The ability to reason and infer new knowledge from an existing base of knowledge and observations of the world around us is one of the principal characteristics of human intelligence. Early efforts in AI recognized this fact and focused on tasks such as proving theorems in miscellaneous, formal mathematical theories. Such theories are very well defined as they consist of a limited set of axioms, assumed to be correct a priori, and rules of inference describing how new knowledge is constructed from existing pieces, namely axioms and previously proved theorems. Every new theorem in such systems is justified by constructing a proof, in form of an abstract tree, with interior nodes labeled by rules of inference and leaves labeled by axioms.

In such systems, new knowledge, in the form of new theorems, is created by finding new valid proof trees. Typically, this involves a search process going through multitudes of many possible trees, in some heuristic fashion, trying to eliminate presumably fruitless and inefficient paths.

The problem is known to be of enormous complexity, such that even the most powerful computers are known to be able to handle only a very small fraction of all possible search spaces. It is because of this complexity, existing in even the simplest of formal of mathematical theories, that such efforts have been greatly reduced.

BRIEF SUMMARY OF THE INVENTION

The present inventor has recognized that human intelligence exists in the context of previous human knowledge and experience. Our civilization has built up an enormous body of inferences involving causal relationships between events, conditions, situations and other concepts at present and throughout human history. The multitude of this knowledge cannot be ascertained solely by abstract philosophical methods in vacuum. AI instead needs to build upon great multitudes of inference knowledge and causality relationships that have been already realized and expressed. The present invention therefore provides systems and methods for collecting and aggregating multitudes of such inferences in order to enable computers to achieve reasoning through access to and use of a Reasoning Graph.

Systems and methods for creation of the Reasoning Graph and ranking of its nodes are described. The nodes of the Reasoning Graph are concepts such as, but not limited to, conditions, situations, events and properties. The directed edges of the Reasoning Graph provide indications that one or more nodes are causes of another, its/their effect, and the given node is the result of, the effect, of one or more causes. The Reasoning Graph is created by collecting and analyzing large quantities of text from sources such as the World Wide Web and other repositories. The collected text is analyzed for lexical and semantic content to uncover causal relationships between events, etc., which are then added to the Reasoning Graph. The nodes of the Reasoning Graph may be ranked with respect to one another.

In one embodiment of the present invention, a system for creating a Reasoning Graph includes a first plurality of crawlers deployed and configured to crawl a repository of unstructured text and to store copies of documents including said unstructured text (e.g., Web pages) in associated storage repositories; and a second plurality of causality extractors coupled to receive and configured operate on contents of the storage repositories to identify and extract cause/effect pairs according to causal relationships therebetween as reported in said unstructured text, said cause/effect pairs being stored as such by said causality extractors in a data structure; specifically, a directed graph in which individual causes and effects extracted by said causality extractors comprise nodes of a directed graph linked by edges representing causal relationships between them. In various embodiments, at least some of the causality extractors may be configured to operate on contents of the storage repositories to identify and extract cause/effect pairs by recognizing, within segments of the unstructured text, keywords expressing causality relationships, segmenting that portion of the unstructured text under review determined to have keywords expressing causality relationships, analyzing said segmented portions to determine boundaries of causes and effects, and storing identified and bounded segments of the unstructured text as the cause/effect pairs. For example, at least some of the causality extractors may be configured to make boundary determinations of causes and effects through identification of lexical groups by occurrences of punctuation, stop-words and pronouns, adverbs, adjectives, and idioms. Alternatively, or in addition, at least some of the causality extractors may be configured to make boundary determinations of causes and effects through use of a deep neural network trained using previous cause and effect boundaries determined by the system. Further, at least some of the causality extractors may be configured to make boundary determinations of causes and effects through identification of lexical groups using one or more natural language toolkits that include libraries for one or more of: classification, tokenization, stemming, tagging, and parsing of unstructured text.

In accordance with further embodiments of the present invention, cause/effect pairs are identified and extracted from a corpus of unstructured text documents according to causal relationships identified between them as reported in those documents, and stored as nodes of a directed graph linked by edges representing the causal relationships between them in a single data structure across one or more storage repositories. At least some of the cause/effect pairs may be extracted from segments of the unstructured text documents through recognition of keywords expressing causality relationships, segmentation of that portion of the unstructured text documents under review determined to have keywords expressing causality relationships, and analysis of said segmented portions to determine boundaries of causes and effects. At least some of the boundary determinations of causes and effects may be made through identification of lexical groups by occurrences of punctuation, stop-words and pronouns, adverbs, adjectives, and idioms. Alternatively, or in addition, at least some of the boundary determinations of causes and effects may be made by a deep neural network trained using previously determined cause and effect boundaries. Further, at least some of the boundary determinations may be made through identification of lexical groups using one or more natural language toolkits that include libraries for one or more of: classification, tokenization, stemming, tagging, and parsing of unstructured text.

In accordance with further embodiments of the invention, redundancies between nodes of the directed graph may be reduced by grouping those nodes representing same, similar, or related concepts together. Such grouping may be performed using one or more of: vector embedding, natural language inference, and textual entailment. In addition, new nodes and edges within the directed graph may be created using textual entailment by deriving logical inferences from fragments of text extracted from the unstructured text documents.

In accordance with further embodiments of the invention, nodes of the directed graph may be ranked based on structures of edges connecting them. Such ranking may be based on eigenvalues of an adjacency matrix characterizing the nodes of the directed graph. In some instances, ranking of the nodes may be based on actions of an actual reasoning surfer, which take into account monitored surfer behaviors with respect to pages associated with the nodes of the directed graph.

In accordance with still further embodiments of the invention, a deep learning network may be trained to perform logical inference operations by using cause nodes of the directed graph as training set inputs with associated and respective effect nodes of the directed graph being expected outputs therefor.

Still additional embodiments of the present invention provide for constructing a directed graph that includes a plurality of nodes, representing causes and effects, and directed edges between said nodes, the directed edges representing causal relationships between said nodes, through identification and extraction of semantic concepts in a corpus of unstructured text documents; ranking said nodes according to principal eigenvalues of a modified reasoning adjacency matrix characterizing said directed graph, and identifying important ones of the semantic concepts according to rank values of their respective cause and effect nodes. Computing the principal eigenvalues of the modified reasoning adjacency matrix may be carried out as an iterative process for a rank vector R of length N, where N is the number of nodes in the directed graph, associated with ranks of nodes in the directed graph, which is initialized to a vector of non-zero values and then successively iterated according to:

$$R(N_i) = \frac{(1-d)}{N} + d\sum_j R(N_j)p_{ij}$$

where d is a constant, and values of $p_{ij}$, representing observed behaviors of visitors to documents associated with the nodes of the directed graph, are characterized by: $0 \le p_{i,j} \le 1$, and $\Sigma p_{i,j} = 1$.

These and additional embodiments of the invention are described further below.

BRIEF DESCRIPTION OF THE DRAWINGS

Embodiments of the present invention are illustrated by way of example, and not limitation, in the figures of the accompanying drawings, in which like references may indicate similar elements, and in which.

DETAILED DESCRIPTION

In graph theory, a directed graph is a graph, or set of vertices or nodes, connected by arcs or edges, where the edges have a direction associated with them. Graphs are used in mathematics and computer science to model pairwise relationships between objects. Described herein is a form of directed graph, referred to as the Reasoning Graph, consisting of nodes defined by causes and effects, together with systems for creating said Reasoning Graph and methods for ranking its nodes. The Reasoning Graph of the present invention is a directed graph of significant scale, comprising, in some instances, billions, and even trillions, of nodes and edges. This scale is a result of crawling vast repositories of information, such as the World Wide Web, and extracting information therefrom. The present inventor's efforts to date indicate that approximately 0.5-2% of pages crawled yield causality relationships for inclusion in the Reasoning Graph. For a corpus of 60 trillion Web pages (the estimated archive assembled by Google LLC), one would thus expect a Reasoning Graph with approximately 0.3-1.2 trillion edges.

Figure 1:
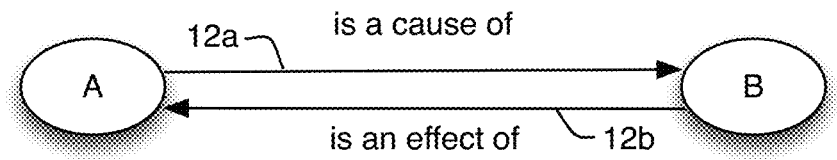
FIG. 1 illustrates a cause/effect node pair of a Reasoning Graph having directed edges therebetween, in accordance with embodiments of the present invention.

As illustrated in FIG. 1, each node A and B of a Reasoning Graph 10 can be conceptualized as an event, situation, condition, time period, or a more general concept. Reasoning Graph 10 is a directed graph and edges 12a, 12b between nodes A and B in Reasoning Graph 10 are defined by causality so that an edge exists between two nodes if one node (the "former") is a cause of another node (the "latter"), which is an effect of the "former". For instance, a cause node such as A could be "Invention of Steam Engine", with the effect node B being "Industrial Revolution". The cause refers to the general event of the invention of steam engine that resulted in the effect of general period of progress, prosperity, and transformation, which was the industrial revolution. Another, very different example would be "Malcolm Butler Interception", with the effect "New England winning instead of Seattle" referring to the closing moments of Super Bowl XLIX of the U.S. National Football League professional sports league.

In the present reasoning graph, nodes do not have to be events. For example, the cause "Air Drying" may have as an effect "Mild Flavor", expressing a cooking technique leaned from experience where mild flavor in dishes can be achieved by air drying. Note also that although mutual edges 12a and 12b are illustrated in FIG. 1, a Reasoning Graph in accordance with the present invention need not employ both. Indeed, in many instances only single edges, e.g., from cause to effect, will be present, with the reverse path being inferred.

Reasoning, that is, understanding and forming conclusions about something through the application of logic, is one of the principal ways in which human intelligence is exhibited. In deductive reasoning, new conclusions are reached from existing and assumed true assumptions through the application of logical rules; or, as explained by Ian Hacking, deduction is a process of inference deriving logical conclusions from premises known or assumed to be true. The present invention makes use of deduction, but is not limited to only deductive reasoning, in constructing the Reasoning Graph; specifically, the transitivity inference of the form A⇒B and B⇒C implies A⇒C. This rule of inference enables the building of paths, or chains consisting of edges, in the Reasoning Graph, where each intermediate node is an effect at an end of one or more preceding edges and a cause at a beginning of one or more subsequent edges.

Humans express such relationships in written text (and other mediums) by employing language describing or indicative of causal relationships, e.g., representing consequences, or effects, of events, situations, conditions, behaviors, general states of affairs, and other concepts determined, ascertained, concluded, believed, or assumed to have caused them. Such causal relationships exist and are expressed in all kinds of records and discourses on human endeavors, including, but not limited to, those pertaining to business, finance, politics, economy, sport, technology, science, fashion, cooking, medicine, philosophy, and practically all other human activities. Today, perhaps the largest repository of this discourse are the documents available on the World Wide Web, consisting of many trillions of interconnected and hyper-linked web pages. The corpus of writings embodied in the Web includes vast numbers documents describing causal relationships of the kind alluded to above, perhaps numbering in the tens and hundreds of billions, even trillions.

Figure 2:
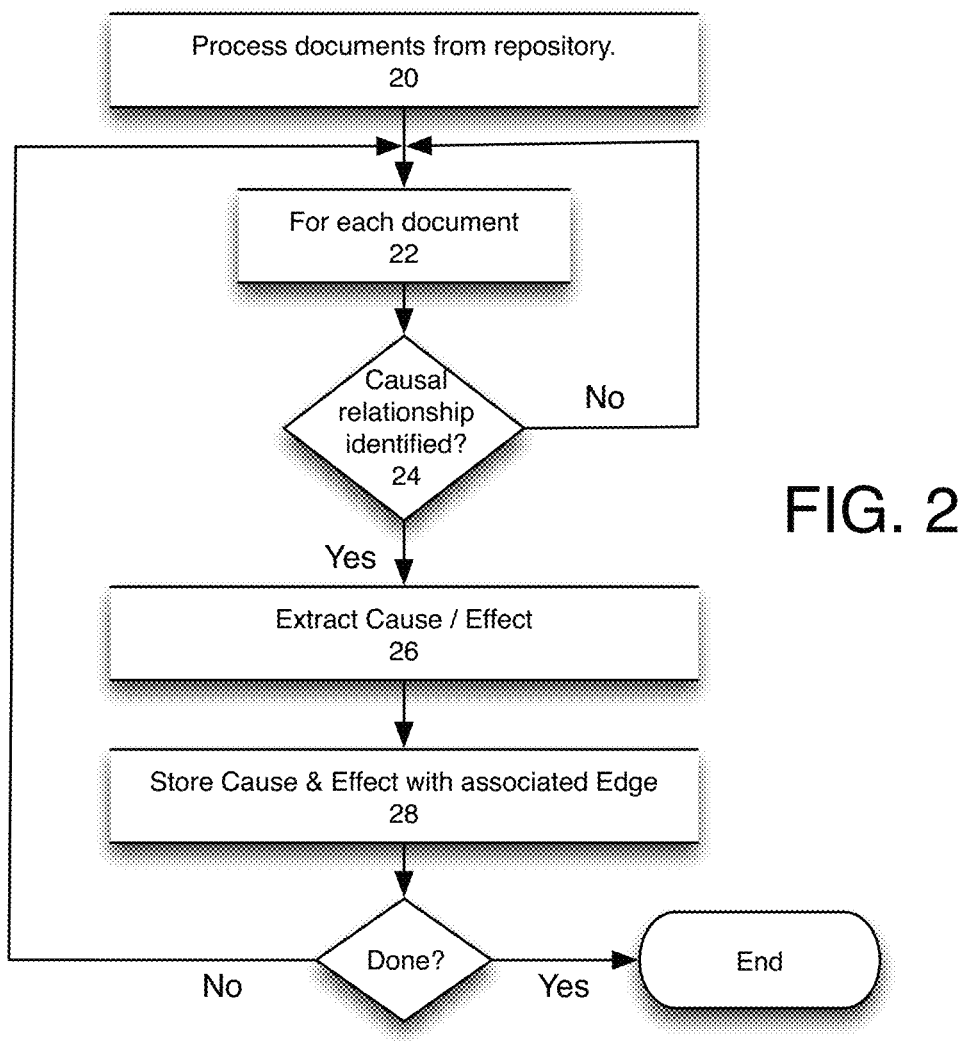
FIG. 2 illustrates a process for creating a Reasoning Graph from a repository of text and, optionally, other media, in accordance with embodiments of the present invention.

In accordance with embodiments of the present invention, and as shown in FIG. 2, the vast quantities of text and, optionally, other media, stored and accessible in the repository of the World Wide Web (and/or other similar repositories, such as those maintained by Google LLC of Mountain View, Calif. and Common Crawl Foundation of Beverly Hills, Calif.) are processed (20) to identify statements of causal relationships (22, 24), which are then analyzed to extract causes and associated effect pairs (26). These cause-effect pairs are collected and stored in a comprehensive data structure (which may be instantiated across many different physical storage media), along with a representation of their associated causal link(s) (28), where they are considered the nodes of the Reasoning Graph, with the links being the edges therebetween. An example of a data structure for storing information concerning nodes of the Reasoning Graph is shown below in Table 1.

TABLE 1

Node Data Structure

| Text description of the node | Pointer to text from which node was extracted | Uniform Resource Locator (URL) of page at which text is found | Method of extraction used | Observations |
| --- | --- | --- | --- | --- |

Edges of the Reasoning Graph are ordered pairs of nodes, and so can be stored as references to existing node entries with their order or other indication implying directionality (e.g., cause and effect). Optionally, pointers to and or the segments of text from which the nodes were extracted, along with explanations of why they were extracted, can be included with the edges.

Figure 3:
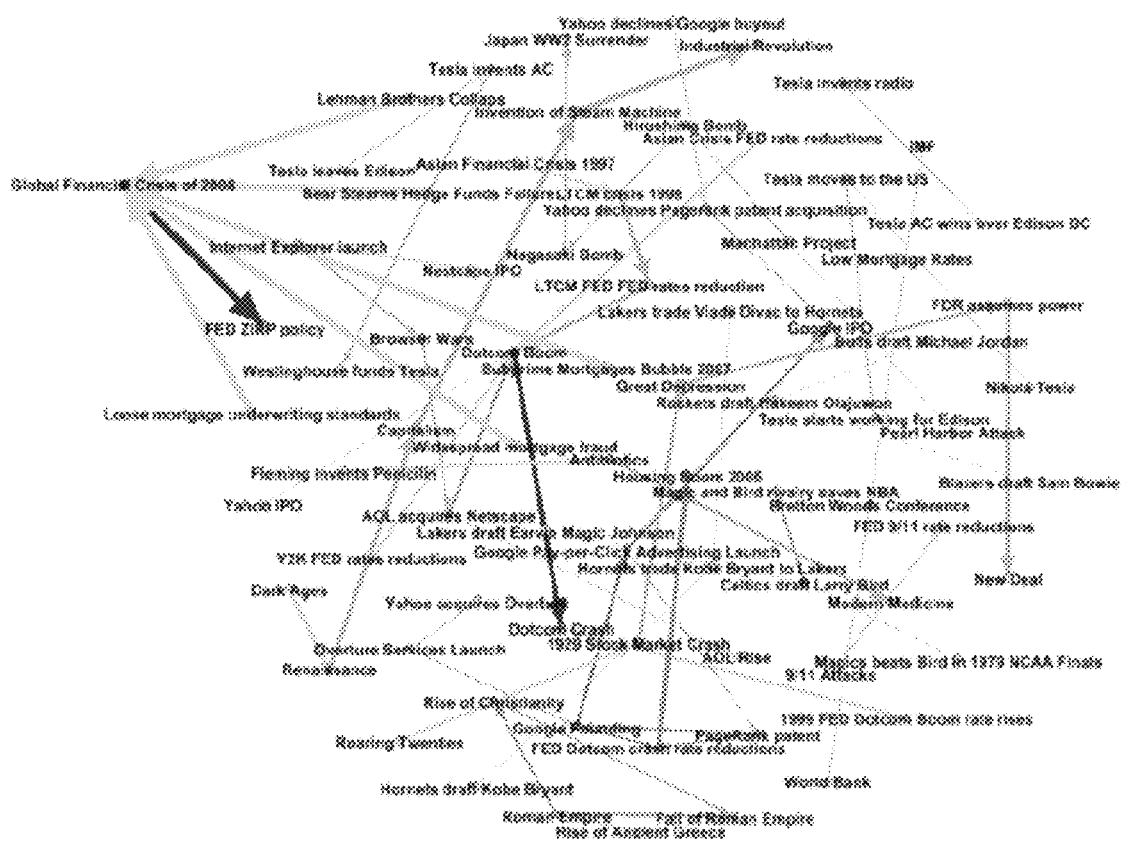
FIG. 3 depicts a portion of a Reasoning Graph constructed in accordance with embodiments of the present invention, with some nodes and edges annotated by text representing the nodes and directions of edges.

Within this structure, the textual description of a node may be a literal copy of the text extracted from the source, or may be a paraphrasing thereof, especially in the case where redundancies among semantically similar nodes has been collapsed to a single entry. The pointer to the source text from which a node was extracted may be any convenient form of pointer, and is used primarily as a source of reference for later examination of the cause or effect represented in the Reasoning Graph. In some embodiments this field may be omitted. Likewise, the URL of the source page on which the source text appears may be an optional inclusion in the data structure. Where included, it is primarily of interest in assessing the veracity of the causality relations represented in the Reasoning Graph and/or as a means of understanding later-made changes thereto. The method of extraction used for a given node may include the one or more keywords by which the associated cause or effect was identified, and/or the type of ANN or other means used to effect the extraction. Maintaining such records is valuable, for example to informing training of neural networks used to extract causality relationships. Finally, including observations regarding nodes allows for indications regarding importance of a node. For example, if a source document indicated the associated cause/effect was a "primary," "principal," "chief," or similar such one of its associated effect(s)/cause(s), that importance may be used to provide weightings for ranking computations using an "actual reasoning surfer" approach, as described below. An illustration of a very small portion of a Reasoning Graph 30 is shown in FIG. 3.

Figure 4:
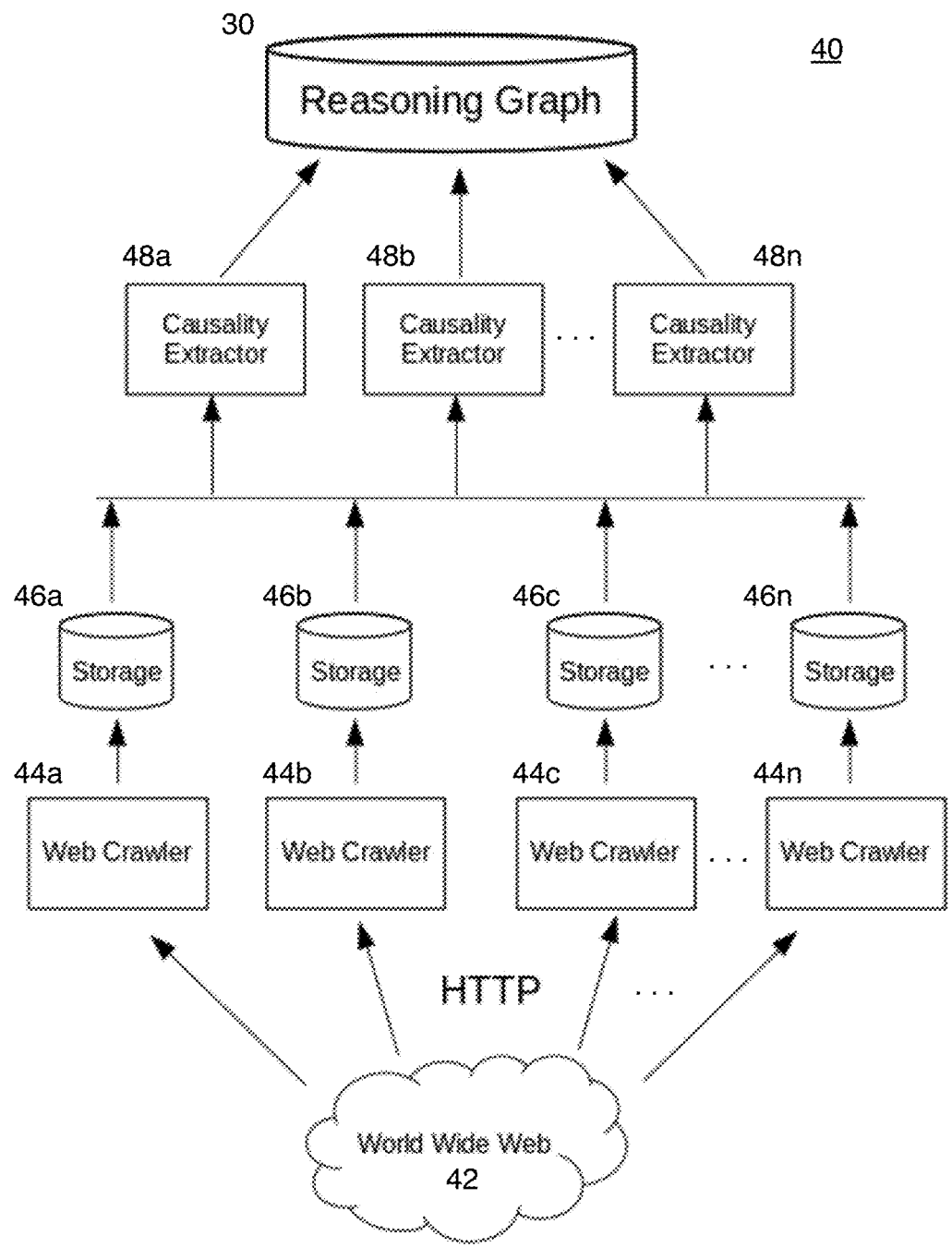
FIG. 4 depicts a general view of an overall architecture of a system for creating a Reasoning Graph in accordance with embodiments of the present invention, where multiple crawler instances are used to simultaneously crawl the World Wide Web in parallel, gathering distinct pages from which raw text is extracted and stored in multiple storage repositories. A multitude of causality extractors operate on the stored text, in parallel, by processing the raw text input to detect instances representing causal relationships, for which cause and effect outputs, and determined causality relationships between them, are recorded.

FIG. 4 illustrates one example of a system 40 for performing the above-described process. A set of web crawlers 44a-44n are deployed and configured to crawl the World Wide Web 42. Web crawlers are specially programmed computer systems that browse the Web in methodical, automated manners, copying Web pages as they go and storing those Web pages in associated storage repositories 46a-46n. An individual storage repository may be shared by many Web crawlers and/or individual Web crawlers may store information in multiple storage repositories. Although the Web crawlers shown in FIG. 4 are indicated as browsing hypertext markup language (HTML) pages, the present invention is not limited to such crawlers and others may be employed to crawl other forms of media such as audio/video recordings, and documents in other formats. Audio/video recordings, for example, may be played by an instance of a software player installed in a Web crawler and the audio portion thereof converted to text that is subsequently stored. Likewise, images may be processed by way of optical character recognition and the resulting text stored by a crawler. If desired, the text snippets and/or source pages of the crawled content and/or references thereto may be stored as well, for example to provide the pointers and references discussed above for later extracted cause/effect pairs.

As further illustrated in FIG. 4, a set of causality extractors 48a-48n operate on the contents of the storage repositories 46a-46n, to identify and extract cause/effect pairs as discussed above. The causality extractors 48a-48n are each specially programmed computer systems that parse the Web pages and other stored content and examine same for indicia of causal relationships between described events, situations, conditions, time periods, and/or more general concepts. The Web pages and/or other stored content are generally assumed to be unstructured text and, in embodiments of the present invention, causality relationships may be extracted from such unstructured text by any or all of several methods.

In one such method, the causality extractors are configured to recognize segments of text including keywords expressing causality relationships, for example: "led to", "set off", "caused", "originated", "invented", "discovered", "created", "composed", "painted", "influenced", and similar words, in both active and passive voice. In the active voice, the text preceding these and similar keywords are deemed to represent causes (one or more), and the text following the keywords are deemed to represent effects (one or more). In the passive voice, the sequence is reversed and the preceding text deemed to represent effects (one or more) and the succeeding text deemed to represent causes (one or more). Such differences in order of causes and effects in the text applies to English and other languages that have similar conventions for sentences written active and passive voice. In other languages, where there is no difference in order, or order the of appearances are different, the identification and extraction can be carried out according to specific rules for such languages.

Upon identification of one or more keywords indicating causality, the causality extractors segment that portion of the text under review corresponding to cause and effect, and a text analysis is performed to determine boundaries (within the text) of those causes and effects. Such a boundary determination may be performed by any of several methods such as, but not limited to, identification of lexical groups by occurrences of punctuation, stop-words and pronouns, adverbs, adjectives, and idioms. In case of pronouns such as "this", but not limited to it, dereferencing is performed to substitute the text to which the pronoun refers. In addition to a rule-driven cause- and effect-boundary determination system as the one described above, a deep neural network can also be instantiated and trained to perform boundary determination tasks with equal or possibly better accuracy. Such a deep neural network can be trained on multitudes of correct cause and effect boundaries determined by the system, supplied as human input, or a combination of both.

In some embodiments, e.g., where the unstructured text being processed by the causality extractors is English language text, a suite of libraries and programs for symbolic and statistical natural language processing known as the Natural Language Toolkit (NLTK) may be used to make boundary determinations of causes and effects. NLTK includes libraries for word tokenization as part of a lexical analysis, identification and localization of n-grams, parts-of-speech recognition and tagging, and named entity recognition. Named entity recognition (NER, also known as entity identification, entity chunking, and entity extraction) is a process for localizing and classifying text into pre-defined categories (e.g., names of persons, locations, entities, expressions of time, etc.). Such systems and libraries can be used for extraction of causes and effects from unstructured text by identifying boundaries of lexical groups according to sentence structures and snippets and tags associated with individual words. More generally, in embodiments of the invention, at least some of the causality extractors are configured to make boundary determinations of causes and effects through identification of lexical groups using one or more natural language toolkits that include libraries for one or more of: classification, tokenization, stemming, tagging, and parsing of unstructured text.

Alternatively, or in addition, the causality extractors may employ dereferencing when identifying segments of text. Segments of texts containing causes and effects may include pronouns such as "this" and "that", which refer to lexical groups within such segments. Dereferencing refers to the identification of segments of text including such pronouns and replacing same with lexical groups referred to be those pronouns. Consider, as an example, the following segment of text: "output was increasing faster than demand, and prices fell sharply. It was this, more than anything else, that led to rapidly declining incomes." In this example, the pronoun "this" in the cause segment preceding "led to" refers to the group "output was decreasing faster than demand, and prices fell sharply" so, when processing the segment of text, a causality extractor would replace "this" with the group "output was decreasing faster than demand, and prices fell sharply".

Where the unstructured text exists in a more complex form, and causality is not explicit from the presence of keywords such as those above, causal relationships among concepts, events, etc., described in the text may nonetheless be recognized by an appropriately trained ANN or a human reader. ANNs can be trained to recognize causality relationships and extract causes and effects from unstructured texts with high accuracy. See, e.g., Bojudj, B. N. "Extraction of Causal-Association Networks from Unstructured Text Data," (June 2009); Lee-Hand, J. and Knott, A., "A neural network model of causative actions," Frontiers in Neurorobotics 2015, 9:4 (2015). Said network can be trained by providing multitudes of human-supplied examples of such causal constructs, together with desired cause and effect extraction results.

For each cause/effect pair extracted by a causal extractor, the pair is stored as nodes of the Reasoning Graph 30 along with one or more directed edges indicating the causal relationship between them. Of course, either or both of these nodes can simultaneously be a cause with respect to one or more edges, and an effect with respect to one or more different edges. Sequences of edges where successive nodes are effects of preceding edges and causes of following edges form paths in the Reasoning Graph. It should therefore be apparent that, in accordance with the present invention, nodes of Reasoning Graphs are identified as end-points, namely causes and effects, of the extracted causality relationships that form edges of Reasoning Graph. In general, a Reasoning Graph will include multitudes of paths comprised of multiple edges where intermediate nodes are simultaneously effects of the preceding cause(s) and causes of the subsequent effect(s).

From the above it will be apparent that redundancies between nodes are a likely occurrence. In the present invention, extracted causes and effects can be, in general, in different syntactic forms that can represent identical, similar or related concepts. In order to analyze and rank nodes in the Reasoning Graph, it can be important to identify and recognize when nodes appearing syntactically different actually represent the same, similar, or related concepts, and to group them. Such concept grouping can be undertaken by word and phrase vector embedding methods such as word2vec. Nodes found to be related, in that they correspond to the same, similar, or related concepts, can be grouped together to yield a graph with a smaller number of nodes, but with denser relationships among them. In addition to grouping similar related nodes of Reasoning Graphs by vector embeddings, new nodes can be created and inferred by methods such as Natural Language Inference, where the goal is to determine if an effect, e, also called a hypothesis, is caused by a cause, c, also called a premise. This determination is performed by more informal analysis of natural language text with an emphasis on informal reasoning, lexical semantic knowledge and the variability of linguistic expression. See MacCartney, B., "Natural Language Inference", PhD Dissertation, Stanford University (2009).

Alternatively, or in addition, so-called Textual Entailment techniques may be used to group nodes and/or to create new nodes and/or edges within the Reasoning Graph. Textual Entailment is a field of research that focuses on attempts to derive logical inferences from short fragments of text. The idea is that it is possible to deduce slightly more general conclusions and facts directly from such fragments by examining word similarity, synonyms, verb tense, and rearrangement of fragments and structure of text. Such techniques are known to be of limited scope as the newly derived conclusions are only directly deduced from very short fragments of text. They suffer, as does the rest of AI in general, from limited knowledge of base facts and inference rules, and limited numbers and scope of rules that can be derived.

As discussed above, in the present invention inference rules are not derived (in the first instance) by limited, local manipulations of very short fragments of text, but are instead extracted from the crawled text and aggregated on a massive scale, all the while assuming the causal relationships reported therein are true. Such an approach much more closely resembles human, high-level reasoning which relies not only on absolute mathematical and other certainties, but also on subjective and imprecise information. That is, the present Reasoning Graph exhibits, in general, many other kinds of knowledge, without absolute proof of its certainty, than is the case with other forms of automated inferencing.

Textual Entailment techniques can be used within the context of the present invention to further enhance the number and scope of causes and effects in a Reasoning Graph. For example, using Textual Entailment techniques, an identified cause or effect may be enhanced to include other causes or effects, as appropriate. Likewise, examination of text from which nodes have already been created using Textual Entailment techniques may yield other, additional nodes. In effect, the vast number of nodes and edges of the Reasoning Graph offer excellent potential candidates for Textual Entailment processes to be applied, thereby leading to aggregation and/or creation of new nodes and/or edges of the Reasoning Graph.

A Reasoning Graph, once constructed in accordance with the present invention, may be used to identify otherwise complex interrelationships between events, etc. The problem of identifying important concepts in isolation has been recognized as very difficult because it requires semantic models of meanings of texts. Purely syntactic methods are of very limited and narrow effectiveness. In addition, the scale of the problem is immense as it includes all concepts humans take for granted from their knowledge and experience. The problem of enumerating and describing collections of such concepts has proven, so far, to be insurmountable as current machine knowledge creation methods are limited to very narrow concepts such as people, places, movies, cities, etc., and the semantic knowledge graphs created so far (largely through the efforts of human curation) range only in the billions of nodes and edges. In accordance with the present invention, such concepts are recognized by being end-points of extracted causality edges of the Reasoning Graph.

Thus, complex inferences—instances of reasoning—can be achieved by finding paths among nodes, and ranking nodes on multitudes of paths. For example, for a Reasoning Graph constructed through identification and extraction of semantic concepts in a corpus of unstructured text documents as discussed above to thereby include a plurality of nodes, representing causes and effects, and directed edges between said nodes, the directed edges representing causal relationships between said nodes, ranking the nodes according to principal eigenvectors of a modified adjacency matrix characterizing said directed graph, as described further below, allows for identifying (e.g., by sorting, tagging, or otherwise delineating) important ones of the semantic concepts according to rank values of their respective cause and effect nodes.

In addition to such graph methods, the multitudes of edges of the Reasoning Graph, representing causality relationship between nodes, can be used as training sets to a deep learning network at a higher level of abstraction, where the deep learning network is trained to learn and generalize more complex causality relationships. Such relationships include, but are not limited to, longer chains and paths of edges in the Reasoning Graph, and new causality paths and relationships inferred from the Reasoning Graph together with similarity relationships among vector embeddings of words and phrases representing cause and effects concepts that are the nodes of Reasoning Graph. In one embodiment, training a deep learning network to perform logical inference operations is done by using cause nodes of the directed graphs as training set inputs with associated and respective effect nodes of the directed graph being expected outputs therefor. Examples of such inference operations include, but are not limited to, modus ponens, modus tolens, double negation elimination, axiom of choice, DeMorgan laws, etc. These rules refer to classical logic but other logic systems with different rules of inference can be used for training of deep learning networks. Thus, in the present invention causes and effects can be used with other logics and rules of inference, not just classical logic.

Ranking Nodes of a Reasoning Graph

Nodes of the Reasoning Graph can be ranked. In this respect, the present invention facilitates identification and recognition of important concepts, events, etc., from vast quantities of unstructured text. In one example, nodes of the Reasoning Graph may be ranked based on the structure of edges and paths connecting them.

Nodes of a directed graph may be ranked according to values in the principal eigenvector of an N×N connectivity or adjacency matrix, C, for the graph, where N is the number of nodes in the graph, and with entries $c_{ij}$:

$$c_{ij} = \begin{cases} 0, & \text{if node } i \text{ does not point to node } j \\ 1, & \text{if node } i \text{ does point to node } j \end{cases}.$$

In the context of the Reasoning Graph, this becomes:

$$c_{ij} = \begin{cases} 0, & \text{if node } i \text{ is not couse of node } j \\ 1, & \text{if node } i \text{ is a cause of node } j \end{cases}.$$

Web pages are often ranked for purposes of reporting responses to search queries. In U.S. Pat. No. 6,285,999, Page describes a method for ranking nodes in linked databases, which became the foundation for the PageRank search algorithm in which search results are reported in an order according to PageRanks of Web pages. This approach has been referred to as the "random surfer" model, as it was shown that the ranks of Web pages (nodes in the directed graph) so computed are equal to the probabilities that a visitor to a Web page who randomly clicks on links will visit the nodes.

In PageRank, a matrix of probabilities closely related to the connectivity matrix are defined where:

$$c_{ij} = \begin{cases} \dfrac{1-d}{N}, & \text{if node } i \text{ is not a couse of node } j \\ \dfrac{1}{outDeg(i)}, & \text{if node } i \text{ is a cause of node } j \end{cases}.$$

This is the so-called Modified Web Adjacency Matrix, where outDeg(i) is the out degree of node i, and represents the number of links leaving Web page i. Node rankings are then calculated as the principal eigenvalues of the Modified Web Adjacency Matrix, according to:

$$PR(pg_i) = \frac{1-d}{N} + d \sum_j PR \frac{(pg_j)}{L(pg_j)},$$

where PR is the PageRank value of a Web page, $pg_i$, d is a constant, N is the number of Web pages, and $L(pg_j)$ is the number of links on page $pg_j$. Constant d is used for accommodation of nodes with no inbound links and represents a probability that a random surfer could jump to a node with no inbound links.

In U.S. Pat. No. 7,716,205, incorporated herein by reference in its entirety, Agapiev describes a method for ranking Web pages based on actual probabilities of users clicking on links, as opposed to uniform probabilities that users would randomly click on links on a Web page. Such a method can be viewed as an "actual surfer" model, as opposed to a "random surfer" model.

In this approach, the connectivity matrix is defined as:

$$c_{ij} = \begin{cases} \frac{1-d}{N}, & \text{if node } i \text{ is not a couse of node } j \\ p_{ij}, & \text{if node } i \text{ is a cause of node } j \end{cases},$$

where $0 \leq p_{ij} \leq 1$, and $\Sigma p_{ij}=1$. The rankings are calculated according to:

$$PR(pg_i) = \frac{1-d}{N} + d\sum_j PR(pg_j)p_{ij}.$$

Instead of using uniform probabilities $1/L(pg_j)$ of a random surfer clicking on a link on Web page $pg_j$, the actual surfer model uses actual probabilities $p_{ji}$ that an actual surfer would click on a link to page $pg_i$ on page $pg_j$.

For the Reasoning Graph, we similarly define a Reasoning Adjacency Matrix (a simple connectivity matrix that includes no damping factor, d) and a Modified Reasoning Adjacency Matrix (which does include damping factor "d" for dangling nodes—i.e., those with no effect(s)), and compute the principal eigenvector with principal eigenvalues of those matrices, using both a "random surfer" and "actual surfer" approach. In one embodiment of the present invention, "actual surfer" probabilities can be derived by observing behaviors of surfers browsing Reasoning Graph nodes, and deriving weightings of the edges in the Reasoning Graph from such "votes." The computation of the principal eigenvalues of the modified reasoning adjacency matrix is carried out as an iterative process for a rank vector R of length N, where N is the number of nodes in the directed graph, associated with ranks of nodes in the directed graph, which is initialized to a vector of non-zero values and then successively iterated according to:

$$R(N_i) = \frac{(1-d)}{N} + d\sum_j R(N_j)p_{ij}$$

The models of a random or an actual surfer visiting nodes of a Reasoning Graph can be designated, respectively, as a random or an actual "reasoning surfer" approach.

In addition to estimating different probabilities of jumping from a node (a cause) to one of the nodes it points to (an effect) by user inputs, in the present invention these probabilities can be also computed by estimations of relative importance of causes to effects. Such estimation can be derived by analysis of text and other graph-related properties such as connectivity in form of density of edges, or the total number of occurrences of nodes in the overall graph, or numbers of occurrences of nodes in the context of appearing together with other nodes, as in word2vec.

HyperReason

HyperText is an early term describing text documents connected by links. By selecting (or "clicking") on a link in a document, one may jump directly to another document, which was the target of the link that was clicked on. This action was the inspiration and basis behind the hypertext transfer protocol (HTTP) and the World Wide Web. HyperText can thus be viewed as an imposition of additional structure upon plain text in a multitude of documents.

In the same fashion, HyperReason represents an additional structure imposed upon collections of nodes in a Reasoning Graph, representing causes and effects. This structure enables surfing and browsing through a Reasoning Graph, by either a human or a computer. The present Reasoning Graph thus facilitates the production of new reasoning knowledge, through browsing of the Reasoning Graph in a fashion similar to that employed in Web surfing, yielding a method for automatically ascertaining causes and effects and their relative importance.

History and the Reasoning Graph

History is generally regarded as the study of the past as it is described in written documents. Its goal as an academic discipline is not just to report what happened in the past, but also to objectively analyze the causes and effects of why certain events happened the way they did. In this respect, the historical record forms a subset of nodes in the general Reasoning Graph. However, in the general Reasoning Graph nodes are not restricted to historical events, but more generally comprise concepts such as situations and conditions. For instance, an edge of Reasoning Graph can express that one node (a cause) denoted "risky lending" points to another node (an effect) denoted "subprime mortgage crisis", expressing the realization that risky lending in general tends to lead to a subprime mortgage crisis.

In the foregoing discussion, various embodiments of the present invention were described as being implemented, at least in part, with the aid and use of computer-implemented processes or methods (i.e., computer programs or routines) instantiated and run on programmable computer systems. Such processes may be rendered in any computer language and executed on any suitable programmable logic hardware. Computer systems upon or with which the methods of the present invention may be practiced will typically include a bus or other communication mechanism for communicating information, and one or more processors coupled with the bus for processing information. These computer systems will also include a main memory, such as a RAM or other dynamic storage device, coupled to the bus for storing information and instructions to be executed by the processor. Main memory also may be used for storing temporary variables or other intermediate information during execution of instructions to be executed by the processor. The computer system will further include a ROM or other static storage device coupled to the bus for storing static information and instructions for the processor. A storage device, such as a hard disk, is also typically provided and coupled to the bus for storing information and instructions. The subject computer system may include a display coupled to the bus for displaying information to a user. In such instances, an input device, including alphanumeric and other keys, is also often coupled to the bus for communicating information and command selections to the processor. Other types of user input devices, such as cursor control devices such as a mouse, a trackball, or cursor direction keys, are also included and coupled to the bus for communicating direction information and command selections to the processor and for controlling cursor movement on the display.

The computer system also typically includes a communication interface coupled to the bus which provides for two-way, wired and/or wireless data communication to/from the computer system, for example, via a local area network (LAN). The communication interface sends and receives electrical, electromagnetic or optical signals which carry digital data streams representing various types of information. For example, two or more computer systems may be networked together in a conventional manner with each using a respective communication interface. The network link typically provides data communication through one or more networks to other data devices. For example, the network link may provide a connection through a LAN to a host computer or to data equipment operated by an Internet service provider (ISP). The ISP in turn provides data communication services through the Internet, which, in turn, may provide connectivity to multiple remote computer systems. The computer system can send messages and receive data through the network(s), network link and communication interface.

Unless specifically stated otherwise, it should be appreciated that the use of terms such as processing, computing, calculating, determining, displaying or the like, refer to the action and processes of a computer system, or similar electronic computing device, that manipulates and transforms data represented as physical (electronic) quantities within the computer system's registers, memories and other storage media into other data similarly represented as physical quantities within the computer system memories, registers or other storage media. Embodiments of the present invention can thus be implemented with such computer systems to perform the operations described herein.

Thus, systems and methods for creation of a Reasoning Graph and for ranking of its nodes have been described.

What is claimed is:

1. A system comprising:
a first plurality of computer systems each configured as Web crawlers deployed and configured to crawl unstructured text documents accessible via the World Wide Web, the first plurality of computer systems configured as Web crawlers each communicably coupled to one or more storage repositories and configured to store copies of said documents in said storage repositories;
a second plurality of computer systems each configured as causality extractors communicatively coupled to said storage repositories and configured to receive and operate on contents of the storage repositories to identify and extract cause/effect pairs according to causal relationships therebetween as reported in said unstructured text documents, said causality extractors further being configured to store said cause/effect pairs as linked nodes in a directed graph instantiated as a single data structure across one or more physical storage media communicably coupled to each of said second plurality of computer systems, in which said nodes of the directed graph are linked by edges representing causal relationships identified by said causality extractors,
wherein respective ones of said second plurality of computer systems include respective processors and memories coupled to said processors, said memories including processor-executable instructions, which instructions, when executed by said processors, cause said processors to configure the respective ones of said computer systems as the causality extractors to operate on contents of the storage repositories to identify and extract the cause/effect pairs by:
parsing said unstructured text documents stored by said Web crawlers,
recognizing, within segments of the unstructured text documents, keywords expressing causality relationships,
determining boundaries of the cause/effect pairs in the unstructured text documents recognized to have keywords expressing the causality relationships, and
storing identified and bounded cause/effect pairs in the unstructured text documents as the nodes of the directed graph in ranked order the single data structure, wherein said nodes are ranked according to observations of surfers browsing said directed graph.

2. The system of claim 1, wherein at least some of second plurality of computer systems configured as the causality extractors are configured, according to said instructions, to make boundary determinations of causes and effects through identification of lexical groups by occurrences of punctuation, stop-words and pronouns, adverbs, adjectives, and idioms.

3. The system of claim 1, wherein at least some of the second plurality of computer systems configured as causality extractors are configured, according to said instructions, to make boundary determinations of causes and effects through use of a deep neural network trained using previous cause and effect boundaries determined by the system.

4. The system of claim 1, wherein at least some of the second plurality of computer systems configured as causality extractors are configured, according to said instructions, to make boundary determinations of causes and effects through identification of lexical groups using one or more natural language toolkits that include libraries for one or more of: classification, tokenization, stemming, tagging, and parsing of unstructured text.

5. The system of claim 1, wherein at least some of said unstructured text documents comprise hypertext markup language (HTML) documents from the World Wide Web.

* * * * *